Patented Apr. 24, 1951

2,549,991

UNITED STATES PATENT OFFICE 2,549,991

METHOD OF PREPARING THIOSTEROLS

Jan Strating, Groningen, Netherlands, assignor to Hartford National Bank and Trust Company, Hartford, Conn., as trustee No Drawing. Application April 11, 1950, Serial No. 155,359. In the Netherlands April 14, 1949

8 Claims. (Cl. 260—397.2)

The invention relates to a method of preparing thiosterols and more particularly to thiosterols and thiochloesterols having therapeutic properties.

Thiosterols have been recommended for curing sulphur deficiencies (U. S. Patent Specification 2,260,953). Moreover, these compounds are expected to act chemotherapeutically (Wagner-Jauregg and Lennartz, Berichte 74, 27, 1941). Thiocholesterol has been described by Wagner-Jauregg and Lennartz. The method of preparation has various disadvantages (U. S. patent specification No. 2,375,873 page 1 left-hand column, lines 13 to 19). Another method of preparing thiosterols is the object of U. S. patent specifications 2,375,973 and 2,375,874 based on the conversion of a sterol-halide with thio-urea, followed by saponification of the reaction product. However, this method has the same disadvantage inherent in the method of Wagner-Jauregg, namely, that the time occupied by the reaction is too long, which is a limitation particularly for preparation on an industrial scale.

It is an object of the present invention to provide a method of preparing thiosterols which is relatively simple and which overcomes the disadvantages inherent in the prior art processes.

According to the invention, thiosterols are prepared by reducing a sterylrhodanide either directly, or after conversion into the corresponding disulphide, with lithium aluminium hydride. The invention also includes the preparation of a new group of steroids, namely, of 7-dehydrothiosterols and is of particular importance for the preparation of 7-dehydrothiocholesterol.

The sterylrhodanides may, for example, be prepared by making an alkali-rhodanide comprising a reactive group linked to the carbon atom 3, act upon a sterol. Moreover, the 7-dehydrosterylrhodanides may be prepared by introducing a double bond between the carbon atoms 7 and 8 into △5,6-sterylrhodanides.

The invention will now be described more fully with reference to the following illustrative examples:

Example I

A solution of approximately 150 mgs. of lithium aluminum hydride in 15 ccs. of dry ether is added dropwise to 2.14 gms. cholesterylrhodanide (0.005 mol.) prepared according to Berichte 74, 30 (1941), dissolved in 10 ccs. of dry ether. A vigorous reaction occurs, the reaction mixture grows hot and a white deposit settles down. After approximately 10 ccs. have been added, no further visible reaction occurs. The reaction mixture is subsequently decomposed with water and dilute hydrochloric acid. The ethereal solution is washed with water to be free from acid and dried on sodium sulphate. After separating the ether in vacuo, the residue is dissolved in 60 ccs. of warm alcohol and water is added until the solution becomes turbid, thus obtaining 1.65 gms. thiocholesterol (81%) having a melting point of 98 to 99.5° C. From the motherlye a further quantity of 0.11 g. (melting point 93 to 97° C.) can be obtained.

Example II 12 ccs. of dry ether and subsequently a solution of approximately 70 mgms. lithium aluminium hydride in 7 ccs. of dry ether are added to 2 gms. decholesteryl disulphide (prepared according to Berichte 74, 30 (1941). Gradually a fine white deposit is formed in addition to the undissolved disulphide. After standing for 19 hours at room temperature, the decholesteryl desulphide dissolved slowly on boiling for one hour. After working up in the aforesaid manner with respect to the reduction of cholesterylrhodanide, and after recrystallization of the reaction product, we obtained 1.77 gms. i. e. 88% of the theoretical yield of thiocholesterol, melting point 96 to 99° C.

Example III

A solution of approximately 130 mgms. of lithium aluminium hydride in 13 ccs. ether is added to a solution of 2.35 gms. of 7-dehydrocholestrylrhodanide in 200 ccs. of dry ether, and a white deposit is formed. After standing for a night at room temperature and working up, the reaction product is recrystallized from ethanol. The 7-dehydrothiocholesterol obtained exhibits the ultra-violet absorption characteristic of 7-dehydrosterols, with maxima at 272.5, 283 and 295 m$\mu$ and minima at 277.5 and 291 m$\mu$.

Example IV 500 mgms. of 7-dehydrocholesterylrhodanide (melting point 139 to 140.4° C.) together with the alcoholate from 110 mgms. of sodium and 12 ccs. of absolute ethanol in an exhausted and sealed tube are heated for 9 hours at approximately 90° C. in a furnace. After cooling down, the contents of the tube are treated with 4 ccs. of hydrochloric acid 2 $n$ and a mixture of 25 ccs. of benzene and 50 ccs. of ether is added, into which the solid material dissolves. The solution is washed with water to be free of acid and subsequently dried with sodium sulphate. After filtering and separating the solvent in vacuo, the residue is boiled with 50 ccs. of absolute alcohol and filtered hot. The undissolved material, which melts at 159 to 161° C., is crystallized from 35 ccs. of ethyl acetate. From the latter, 350 mgms. of bis - (7-dehydrocholesteryl-3) - disulphide crystallize in small colourless rosettes having a melting point of 161 to 163° C. On further cooling the motherlye yields an additional quantity of 40 mgms.

*Analysis*

Found: C 80.50; 80.38; 80.44; H 11.05, 10.93, 10.98. Calculated C 81.16; H 10.81 for $C_{54}H_{86}S_2$ (799.05 mg.). The bis-(7-dehydrocholesteryl-3)-disulphide exhibits the ultraviolet absorption characteristic of 7-dehydrosterols. Maxima at 273, 284 and 296 m$\mu$ with an $$E_{1\,cm.}^{1\%}$$

of 306, 331 and 194, respectively, and minima at 278 and 292 m$\mu$ with an $$E_{1\,cm.}^{1\%}$$

of 260 and 172, respectively. The bis-(7-dehydrocholesteryl-3-)-disulphide is adapted to be reduced to 7-dehydrothiocholesterol in the manner set out in Example II.

While we have thus described the invention with specific applications and examples thereof, other modifications thereof will appear obvious to those skilled in the art without departing from the spirit and scope of the invention.

What I claim is:

1. A process for the preparation of a thiosterol which comprises subjecting a sterol rhodanide to the action of lithium aluminium hydride.

2. A process for the preparation of a thiocholesterol which comprises subjecting a cholesterol rhodanide to the action of lithium aluminium hydride.

3. A process for the preparation of a thiodehydrosterol which comprises subjecting a dehydrosterol rhodanide to the action of lithium aluminium hydride.

4. A process for the preparation of a thiodehydrocholesterol which comprises subjecting a dehydrocholesterol rhodanide to the action of lithium aluminium hydride.

5. A process for the preparation of a thiosterol which comprises the steps of converting a sterol rhodanide into the corresponding sterol disulphide, and subjecting the latter to the action of lithium aluminium hydride to form the corresponding thiosterol.

6. A process for the preparation of a thiosterol which comprises the steps of converting a cholesterol rhodanide into the corresponding cholesterol disulfide, and subjecting the latter to the action of lithium aluminium hydride to form the corresponding thiosterol.

7. A process for the preparation of a thiosterol which comprises the steps of converting a 7-dehydrosterol rhodanide into the corresponding dehydrosterol disulfide, and subjecting the latter to the action of lithium aluminium hydride to form the corresponding thiodehydrosterol.

8. A process for the preparation of a thiosterol comprising the steps of converting 7-dehydrocholesterol-rhodanide into the corresponding 7-dehydrocholesterol disulfide, and subjecting the latter to the action of lithium aluminium hydride to form the corresponding thiodehydrocholesterol.

JAN STRATING.

No references cited.